H. C. CAREY.
DRY GOODS MEASURE.
APPLICATION FILED AUG. 13, 1921.
1,413,254. Patented Apr. 18, 1922.
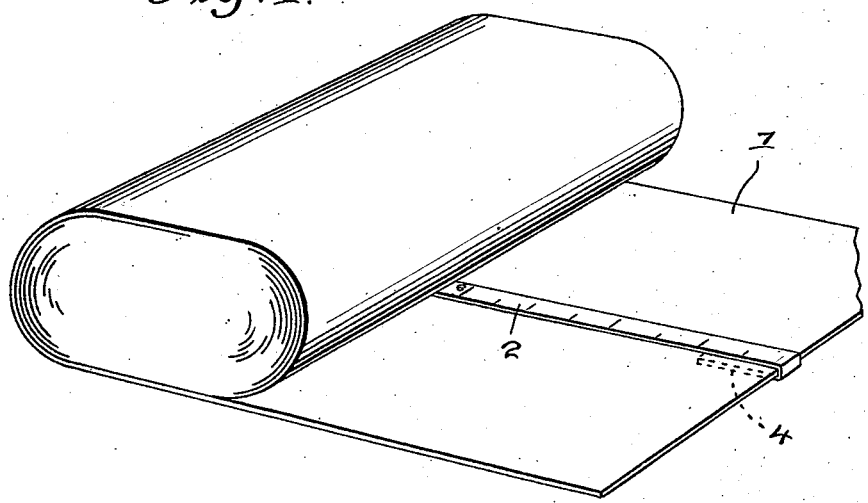
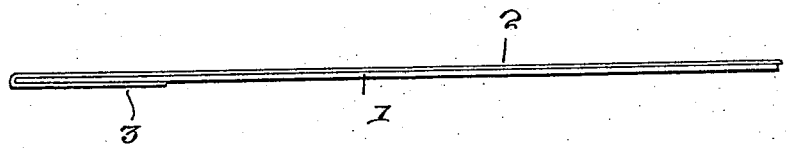
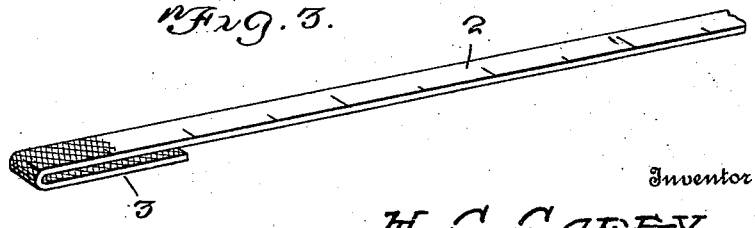
Witnesses:-
William Thicketur
Hyman Berman
Inventor
H. C. CAREY.
By Clarence A. O'Brien
Attorney

UNITED STATES PATENT OFFICE.

HARRY C. CAREY, OF CARPENTER, SOUTH DAKOTA.

DRY-GOODS MEASURE.

1,413,254.  Specification of Letters Patent.  Patented Apr. 18, 1922.

Application filed August 13, 1921. Serial No. 492,101.

*To all whom it may concern:*

Be it known that I, HARRY C. CAREY, a citizen of the United States, residing at Carpenter, in the county of Clark and State of South Dakota, have invented new and useful Improvements in Dry-Goods Measures, of which the following is a specification.

My present invention pertains to dry goods measures such as are designed to be wrapped in bolts of dry goods in the direction of the length of the strip of goods.

The object of the invention is to provide an improved measure of the type indicated characterized by the capacity to be bent against the end or ends of the strip of goods so that the measure will always be in position to accurately indicate the length of the strip of goods remaining in the bolt after portions of the goods have been cut and removed from the bolt.

To the attainment of the foregoing, the invention consists in the improvement as hereinafter described and definitely claimed.

In the accompanying drawings, forming part of this specification:—

Figure 1 is a perspective showing my improvement applied.

Figures 2—3 are detail views hereinafter explicitly referred to.

Similar numerals designate corresponding parts in all of the views of the drawings.

The bolt of dry goods is designated 1, and my novel measure is designated by 2. The specific graduations of the measure 2 are not of the essence of my invention though I prefer to make the graduations in yards and fractions of yards for obvious reasons.

In accordance with my invention the measure 2 in the form of a tape is formed of appropriate material possessed of sufficient pliability or ductility to retain the shape in which it is placed. Because of this capacity of the tape an inner end portion 3 and an outer end portion 4 of the said tape are adapted to be bent into hook form to positively engage the inner and outer ends, respectively, of the strip of dry goods 1, and are also adapted to be pressed or clamped against the said end portions with a view to preventing casual disconnection or displacement of the hook ends from the strip of dry goods and this without injuring in any degree any portion of the piece of dry goods. From this it follows that the hook end 3 will be engaged with the inner end of the piece of dry goods until the last portion of the bolt is sold; also, that as each length of goods is cut from the bolt, the measure 2 will also be cut, after which a fresh portion of the measure 2 will be bent into the hook form 4 and pressed or clamped against the remaining outer end portion of the dry goods to secure the said fresh portion of the measure relatively to the outer end portion of the piece of goods. In this way the measure will always be retained in proper working position relatively to the bolt of goods, and accuracy of the measure afforded by the improvement will be promoted.

It will be apparent from the foregoing, that the improved measure may be produced so cheaply as to render it feasible for a measure to be used up incident to the vending of a bolt of dry goods.

Manifestly through the medium of the measure characterized as described the vendor of the goods will be informed at all times of the amount of goods remaining in the bolt.

Having described my invention, what I claim and desire to secure by Letters-Patent, is:

As a new article of manufacture, a graduated tape measure for use in a bolt of dry goods and for arrangement lengthwise of the strip comprised in the bolt; the said measure being characterized throughout its length by pliability or ductility sufficient to permit of its end portions being bent into hooks and when so pressed being pressed against the end portions of the strip of goods and when so pressed to clamp the goods and retain themselves in position on said end portions.

In testimony whereof, I affix my signature.

HARRY C. CAREY.